(12) United States Patent
Wimsatt et al.

(10) Patent No.: US 7,584,835 B2
(45) Date of Patent: Sep. 8, 2009

(54) ADJUSTABLE V-PLOW APPARATUS FOR DEFLECTING MATERIAL CARRIED ON A BELT

(75) Inventors: David Wimsatt, Garden City, MO (US); Brian H. Ritter, Macungie, PA (US); George T. Mott, Alburtis, PA (US)

(73) Assignee: ASGCO Manufacturing, Inc., Allentown, PA (US)

( * ) Notice: Subject to any disclaimer, the term of this patent is extended or adjusted under 35 U.S.C. 154(b) by 149 days.

(21) Appl. No.: 11/371,467

(22) Filed: Mar. 9, 2006

(65) Prior Publication Data

US 2006/0243306 A1    Nov. 2, 2006

Related U.S. Application Data

(60) Provisional application No. 60/660,644, filed on Mar. 11, 2005.

(51) Int. Cl.
*B65G 47/74* (2006.01)

(52) U.S. Cl. .................. 198/497; 198/494; 198/496; 198/499; 198/498; 198/635

(58) Field of Classification Search ................ 198/496, 198/497, 498, 499, 635
See application file for complete search history.

(56) References Cited

U.S. PATENT DOCUMENTS

| | | | |
|---|---|---|---|
| 689,881 A | | 12/1901 | Hoy |
| 1,729,322 A | * | 9/1929 | Barber ........................ 198/497 |
| 1,933,485 A | | 10/1933 | Rund et al |
| 2,859,864 A | | 11/1958 | Ibaugh et al |
| 3,047,133 A | * | 7/1962 | Searles ........................ 198/498 |
| 3,865,232 A | * | 2/1975 | Koenig et al. ............... 198/497 |
| 4,529,084 A | * | 7/1985 | Zhang ........................ 198/499 |
| 4,773,526 A | * | 9/1988 | Slikker ........................ 198/497 |
| 4,811,833 A | * | 3/1989 | Slikker ........................ 198/499 |
| 4,944,386 A | * | 7/1990 | Swinderman ............... 198/499 |

(Continued)

FOREIGN PATENT DOCUMENTS

JP    63272711 A   * 11/1988

(Continued)

OTHER PUBLICATIONS

ASGCO Manufacturing, Inc., "Belt Protection System-Premium Hinged V-Plow," 1 Page, © 2005.

(Continued)

*Primary Examiner*—Gene Crawford
*Assistant Examiner*—Kavel P Singh
(74) *Attorney, Agent, or Firm*—Clement A. Berard, Esq.; Dann, Dorfman, Herrell & Skillman, PC

(57) ABSTRACT

An adjustable V-plow apparatus for removing material from a belt may comprise pivotably connected first and second frame arms that may be pivoted at the pivotable connection for adjusting the angle therebetween. A cleaning media is mounted to the first and second frame arms for providing a cleaning edge along the first and second frame arms. A mounting is attached to the first and second frame arms proximate the pivotable connection thereof. The mounting may comprise a base plate and an arm for positioning the adjustable V-plow to engage a belt.

30 Claims, 12 Drawing Sheets

U.S. PATENT DOCUMENTS

| | | | | |
|---|---|---|---|---|
| 5,201,404 | A | * | 4/1993 | Hurd et al. .................. 198/636 |
| 5,412,461 | A | * | 5/1995 | Thayer ....................... 399/351 |
| 5,875,881 | A | * | 3/1999 | Brink ......................... 198/499 |
| 6,820,734 | B1 | * | 11/2004 | Gilbert et al. ............... 198/499 |

FOREIGN PATENT DOCUMENTS

| | | | |
|---|---|---|---|
| JP | 01013327 A | * | 1/1989 |
| WO | WO 9408877 A1 | * | 4/1994 |
| WO | WO 9429203 A1 | * | 12/1994 |

OTHER PUBLICATIONS

ASGCO Manufacturing, Inc., "Return Premium Hinged V-Plow-Installation, Operation & Maintenance Instructions," 9 Pages, ( © date incorrect, see Statement).

ASGCO Manufacturing, Inc., "Belt Protection System-Premium Hinged V-Plow," www.asgco.com, 1 Page, © 2005.

ASGCO Manufacturing, Inc., "ASGCO Standard Hinged V-Plow In Application," http://www.asgco.com/v_plow_standard_application.shtml, 2 Pages, © 2006.

ASGCO Manufacturing, Inc., "ASGCO Standard Hinged V-Plow Belt Cleaner," http://www.asgco.com/v_plow.shtml, 2 Pages, © 2006.

Material Control, Inc, Bulletin MC-500A, "Model 76 Rubber Wiper Blade Conveyor Belt Cleaner And Model 74 Plow Type Conveyor Belt Cleaner," Copyright 1990, 2 Pages.

Source Unknown, "Torsion Arm-Tail Protection Plows," Section "C", Effective: Oct. 1, 1992, pp. 63-64.

Argonics, Inc., Technical Product Bulletin, "V-Max™. V-Plow & X-Plow Conveyor Belt Cleaning Systems," V-Max, Marquette, MI, 1 Page.

Prok Group Limited, "Prok Belt Cleaners & Ploughs," 6 Pages, Date Unknown.

Flexible Steel Lacing Co., Flexco, DV200, "Deflector Conveyor V-Plow," advertising@flexco.com, 1997, 2 Pages.

Hosch, "45° Belt Plow Systems," Date Unknown, 2 Pages.

* cited by examiner

ADJUSTABLE V-PLOW APPARATUS FOR DEFLECTING MATERIAL CARRIED ON A BELT This Application claims the benefit of U.S. Provisional Application No. 60/660,644 entitled "Belt Cleaning Apparatus" that was filed on Mar. 11, 2005.

FIELD OF THE INVENTION

The present invention relates to an adjustable plow apparatus for deflecting materials carried on a belt.

BACKGROUND

Conveyor belts are widely used to move material from one location to another. The majority of conveyors are prone to spillage of material in areas where the material is loaded onto the conveyor belt. In addition, there can be spillage along the travel path of the belt caused by uneven loading or overloading of material on the conveyor belt. Spillage of material can lead to the accumulation of "carry back", which is material on the load carrying side of the conveyor belt that spills over the sides of the belt and lands on the inner surface of the return run of the belt. Carry back that accumulates on the inner surface of the return run travels toward the tail pulley. If the carry back is not removed, the carry back will lodge between the tail pulley and the inner surface of the belt, causing damage to the belt, the pulley or both.

In some cases, plows are mounted over the return run of the conveyor to remove carry back. The plows are usually cumbersome to install into new or existing systems. Many plows are heavy, making them difficult to lift and install between the belt runs or between the belt and structure. Other plows are large and come pre-assembled, making it difficult to fit the plows through the narrow clearance spaces between conveyor belts and their support frames. The majority of plows are made of steel. If steel components are allowed to touch the inner surface of the belt, there can be considerable damage to the surface of the belt.

Another drawback of many plows is the inability to adjust the position of the plow in response to displacement of the conveyor belt. These plows are also not adjustable in response to the wearing or degradation of the cleaning media that engages the belt. If the plow is not allowed to adjust to the vertical movement of the belt and to the wearing of the cleaning media, the cleaning media will not remain in proper engagement with the belt, preventing the belt from being cleaned. Based on the foregoing, plows that are presently used to remove carry back and other materials from conveyor belts leave much to be desired in terms of how they are installed and operate.

SUMMARY OF THE INVENTION

Accordingly, there is a need for an improved apparatus for deflecting material carried on a conveyor belt.

To this end, apparatus for deflecting material carried on a belt may comprise first and second frame arms pivotably connected together at their respective first ends, a cleaning media mounted to the first frame arm and to the second frame arm for providing a cleaning edge along the first and second frame arms for engaging a belt, and a mounting attached to the first and second frame arms proximate the pivotable connection thereof for mounting the first and second frame arms proximate a belt.

BRIEF DESCRIPTION OF THE DRAWING

The detailed description of the preferred embodiment(s) will be more easily and better understood when read in conjunction with the FIGURES of the Drawing which include.

Figure 1:
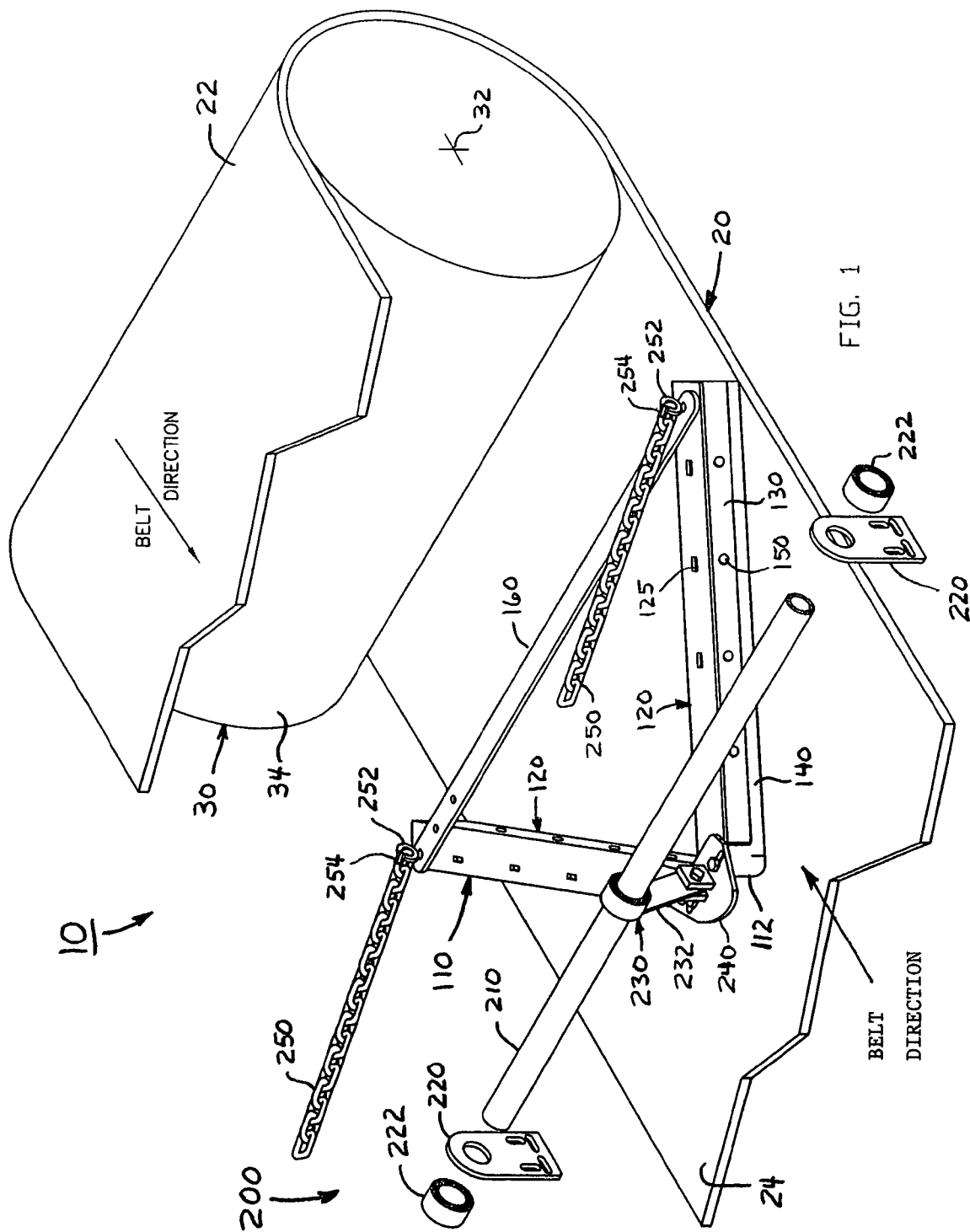
FIG. 1 is an isometric view of an example conveyor system including an example embodiment of a V-plow apparatus in accordance with the present arrangement installed on a conveyor belt.

In the Drawing, where an element or feature is shown in more than one drawing figure, the same alphanumeric designation may be used to designate such element or feature in each figure, and where a closely related or modified element is shown in a figure, the same alphanumerical designation primed or designated "a" or "b" or the like may be used to designate the modified element or feature. Similarly, similar elements or features may be designated by like alphanumeric designations in different figures of the Drawing and with similar nomenclature in the specification. It is noted that, according to common practice, the various features of the drawing are not to scale, and the dimensions of the various features are arbitrarily expanded or reduced for clarity, and any value stated in any Figure is given by way of example only.

DESCRIPTION OF THE PREFERRED EMBODIMENT(S)

An adjustable V-plow arrangement is described herein, first in general terms and then with reference to specific FIGURES of the Drawing. The problems associated with plows in the present state of the art may be addressed and even may be solved to a great degree by the present arrangement, which features a V-shaped plow 100 for deflecting materials from a belt, e.g., for deflecting carry back or other materials from the inner side 24 of the return run of a conveyor belt 20. V-plow 110 of the present arrangement allows horizontal angular adjustment of the V-shape which can simplify installation and removal of V-plow arrangement 110 in a conveyor system 10. The adjustability of the apex angel of V-plow 110 may also permit V-plow 110 to be adjusted to custom fit to conveyor belts 20 having a wide range of belt widths. In one embodiment, V-plow 110 has a pivotable element 114 at the apex of its "vee" so as to be foldable and to allow adjustment of the apex or "vee" angle. This foldability characteristic permits V-plow 110 to easily be folded and slid between the conveyor frame and belt, allowing installation and removal to be much safer and easier.

Adjustable V-plow 110 has a flexible cleaning media 140 for engaging the inner surface 24 of conveyor belt 20. An optional connecting nose cap 170 (described below) may be connected with cleaning media 140, which allows for a consistently crisp edge on the V-plow 110 to aid in deflecting and removing fugitive material 12, i.e. unwanted material, on the belt 20. Cleaning media 140 may be attached to the plow arms 120 by a variety of fasteners 150, including but not limited to clevis pins 152, and hairpin clips 153 (sometimes referred to as clips and as cotter pins), and may be supported by one or more media holders 130.

Clevis pins 152 may have a predetermined length to allow the use of a media compression tool as described below, to enable force to be applied to clevis pin 152 so as to compress cleaning media 140 between a media holder 130 and a frame arm 120. Clevis pins 152 thus press against the media holders 140 which in turn, press into the cleaning media 120 for insuring a snug fit, and easing the placing of hairpin clip 153 in clevis pin 152. As a result, cleaning media 140 is supported by media holders 130 and by frame arms 120 between which it is positioned, and preferably is compressed.

The V-plow 110 has a structure 240 mounted on the top located at the front at the apex 112. This structure 240 is connected with a power arm 230 or adjustor arm 230 connected to a mounting tube 210. The power arm 230 pivots and rotates to allow the plow 110 to move in a direction normal to the belt 20 surface 24 in response to deflection of the belt 20, with slight movement in a direction parallel to the direction of the belt 20.

The pivotable apex 114 of the V-plow 110 allows for the folding of the plow 110 for shipping, installation, and varying belt widths. If desired, one or more rear-mounted tethers 250, which can include chain, rope, braided wire, or another material having tensile strength, can be mounted at a convenient point along the conveyor 10 frame to limit displacement of the V-plow 110 relative to the belt 20, while permitting some displacement in the direction normal to the belt 20 and the direction to the direction of belt travel. Tethers 250, also referred to as safety chains, may provide a safety feature as well.

Figure 2:
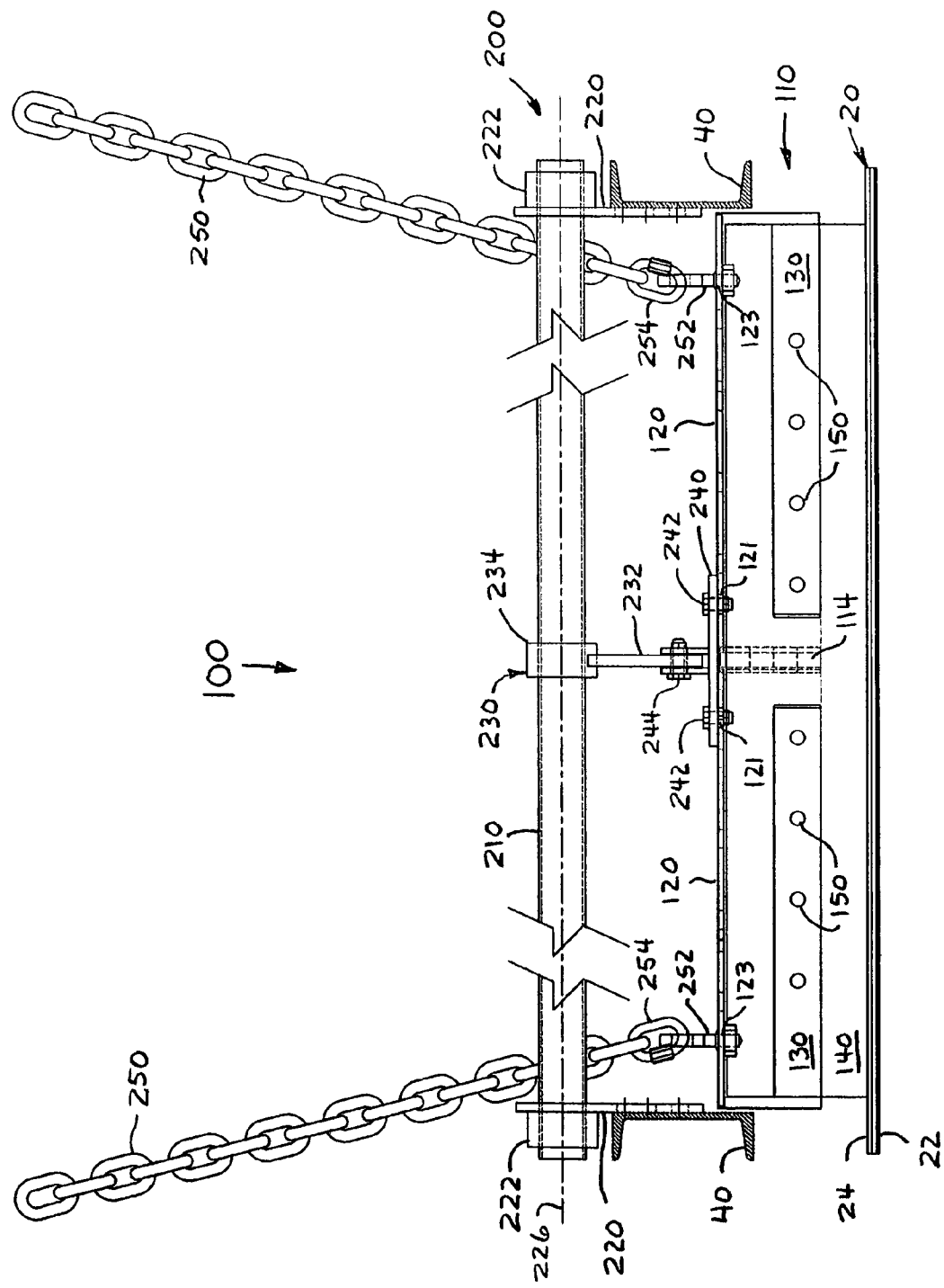
FIG. 2 is a front view of the example embodiment of a V-plow apparatus as it would look mounted and riding on a conveyor belt.
Figure 3:
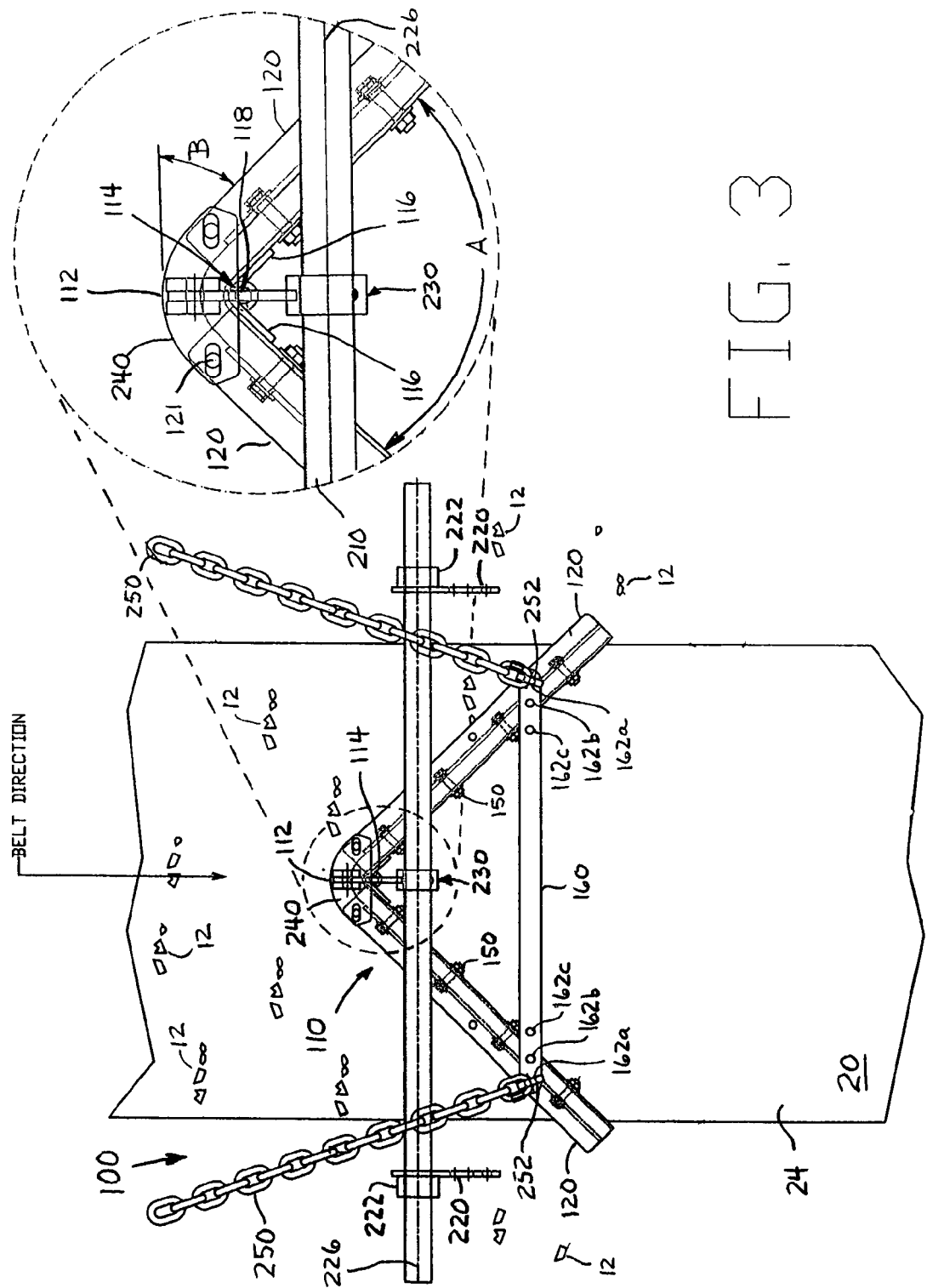
FIG. 3 is a top view of the example embodiment of a V-plow apparatus mounted adjacent a conveyor belt carrying fugitive material headed towards the V-plow apparatus and being ejected, and includes an enlarged top view of the hinged apex portion of the V-plow apparatus.
Figure 4:
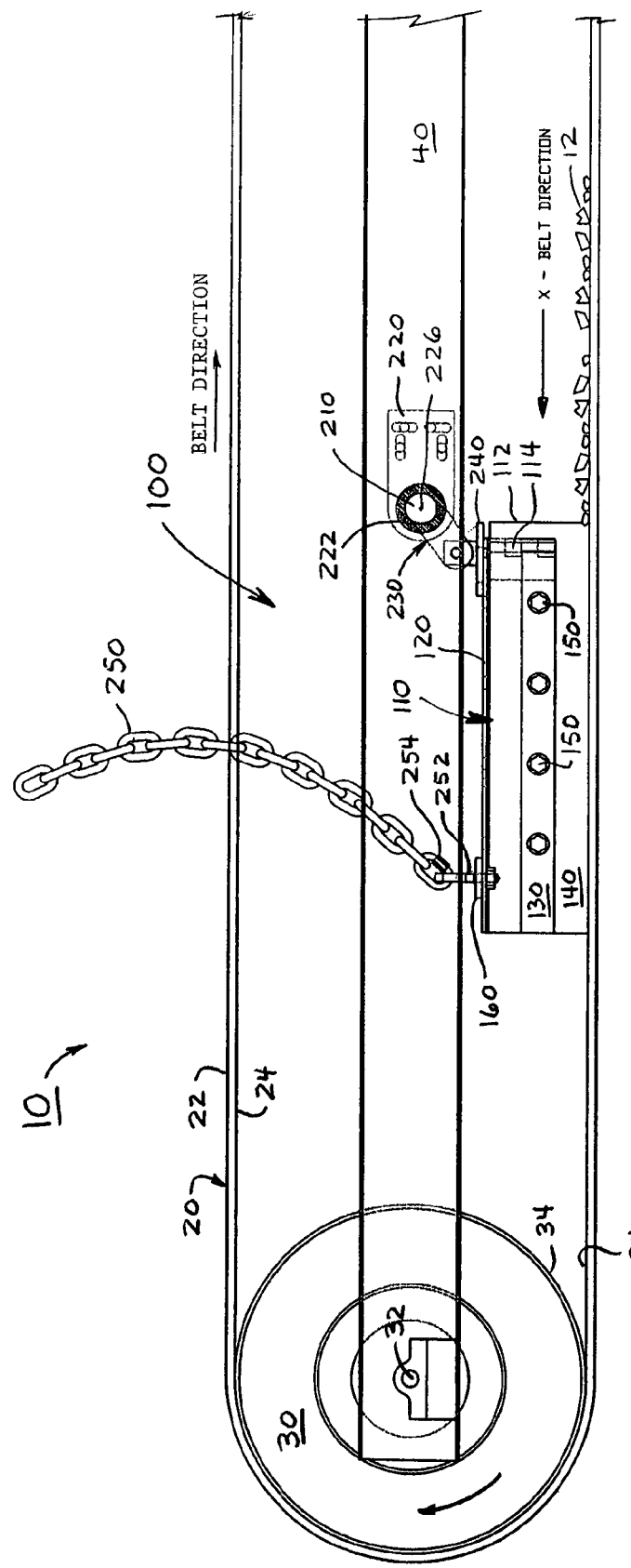
FIG. 4 is a side view of the example conveyor system and the example embodiment of a V-plow apparatus on a conveyor belt.

The present arrangement is specifically described first in relation to FIGS. 1-4 of which FIG. 1 is an isometric view of an example conveyor system 10 including an example embodiment of V-plow apparatus 100 in accordance with the present arrangement installed on conveyor belt 20, FIG. 2 is a front view of the example V-plow apparatus 100 as it would look mounted and riding on conveyor belt 20, FIG. 3 is a top view of the example V-plow apparatus 100 mounted adjacent conveyor belt 20 carrying fugitive material 12 headed towards V-plow apparatus 110 and being ejected, and includes an enlarged top view of a pivotable hinged apex 114 portion of V-plow apparatus 100, and FIG. 4 is a side view of example conveyor system 10 and example V-plow apparatus 100 on conveyor belt 20.

Conveyor system 10 includes a conveyor belt 20 that rides over a rotatable head pulley (hot shown) an a rotatable tail pulley 30 for conveying material on material carrying surface 22 of belt 20. Tail pulley 30 has a cylindrical surface 34 upon which the inner surface 24 of belt 20 rides, and is rotatable about pulley axle (or axis) 32. Conveyor system 10 further includes an adjustable V-plow apparatus 100 that comprises an adjustable V-plow 110 and a plow support 200. The term "front" or "forward" usually refers to the portion of V-plow 110 toward which belt 20 travels and the term "rear" or "rearward" usually refers to the portion of V-plow 110 away from which belt 20 travels. In other words, the head pulley is in "front" of V-plow 110 and tail pulley 30 is to the "rear" of V-plow 110.

Adjustable V-plow 110 comprises a frame having a pair of arms 120 extending rearward from an apex at which they are joined by a pivot 114, e.g., a hinge 114, and at which they are attached to base plate 240 of power arm 230. The transverse spacing of the rearward ends of arms 120 are maintained apart at a predetermined spacing by angle holder 160, thereby to set the included angle A between arms 120 and a plow angle B of each arm with respect to a direction transverse to belt 20. Flexible cleaning media 140 is formed and attached to arms 120 so as to have a V-shaped edge bearing on conveyor belt 20, and is held to arms 120 by media holders 130 and fasteners 150. Preferably, V-plow 110 rides on surface 22 of belt 20 with the respective rearward ends of cleaning media 140 about at the edges of belt 20 and with apex 112 about at the center of belt 20 so that material 12, e.g., "fugitive" material, on the inner surface 24 of belt 20 will be deflected towards the edges of belt 20 and off of belt 20 at the edges thereof.

Fugitive material 12, which usually comes to be on inner surface 24 of belt 20 due to debris or to spillage and/or overflow of material carried on carrying surface 22 of belt 20, e.g., at a loading location or along the travel path of belt 20 or both, is desirable removed from surface 24 before it comes into contact with pulley 30, which is desirable to avoid such material 12 from coming between surface 24 of belt 20 and surface 34 of pulley 30 where it could damage belt 20 or pulley 30 or both.

Plow support 200 comprises a support tube 210, sometimes referred to as mounting tube or mounting pipe 210, that is mounted transverse to belt 20 and the travel direction thereof and a pair of limit tethers 250. Support tube 210 locates the apex 112 of V-plow 110 in a desired position near to the center of belt 20 and is positioned so that cleaning media 140 is in physical contact with inner surface 24 of belt 20. Support tube 210 also locates V-plow 110 in a desired position along the length of the return leg of belt 20, e.g., typically close to tail pulley 30.

Support tube 210 may be and typically is arranged to be rotatable in mounting brackets 220, and so power arm 230 is rotatable about axis 226. Alternatively and optionally, power arm 230 may be arranged to be rotatable on support tube 210 so that power arm 230 may rotate about axis 226. Because power arm 230 is rotatable about axis 226, adjustable V-plow 110 is free to move toward and away from belt 20, e.g., generally vertically. (The horizontal movement of V-plow 110 in the direction of belt movement due to rotation of power arm 230 is relatively small in relation to the size of V-plow 110, to the length of belt 20, and to the distance of V-plow from tail pulley 30, and so is usually of little concern).

Preferably, support tube 210 and power arm 230 are dimensioned and positioned to preclude any metal element of V-plow 110, e.g., a frame arm 120 or media holder 130, from contacting inner surface 24 of belt 20 as cleaning media 140 wears.

Similarly, tethers 250 are of a length to preclude the rear of V-plow 110, e.g., the rearward end of a frame arm 120 or of a media holder 130, from contacting surface 24 of belt 20 as cleaning media 140 wears. One end of each tether 250 is attached to the rearward end of a respective frame arm 120 by an eye bolt 252 that passes through holes in arm 120 and in angle holder 160, which may be threaded or may employ a nut. The other end of each tether 250 is attached to a fixed structure (not shown). Tethers 250 may have quick-release connections, e.g., such as a quick-connect/disconnect link 254 of chain tether 250, to facilitate connection and disconnection of tethers 250 when installing and removing V-plow 110 in conveyor system 10.

Tethers 250 have sufficient strength to support the weight of V-plow 110. Tethers 250 may also provide a safety feature in preventing V-plow 110 from dropping or from moving sideways too far off the center line of belt 20, as could occur in the case of a belt breakage or other fault condition. Tethers 250 are preferably installed so as to lean forward (e.g., towards the apex 112 end of V-plow 110) at an angle of about 45° when taught, and slightly outward from belt 20

The respective ends of support tube 210 may be rotatably mounted to a fixed support structure, such as the side frame 40 of conveyor 10, e.g., by a pair of mounting brackets 220, and may be held in mounting brackets 220 by collars 222 to limit side-to-side movement. V-plow 110 is attached to support tube 210 at about the center of the transverse length thereof by power arm 230. Specifically, for example, power arm 230 may have a collar 234 through which support tube 210 passes, may have a strut 232 extending from collar 234, and may have a base plate 240 that is attached to strut 232, e.g., by bolt 244, and to the respective arms 120 of V-plow 110, e.g., by bolts 242. Typically, collars 222 and 234 are secured in position on support tube 210 by set screws, by pins, or by another fastening means, but could be welded or otherwise permanently fastened.

Thus, V-plow 110 is free to move in the vertical direction, e.g., towards and away from surface 24 of belt 20, and can follow vertical movement of belt 20 for maintaining contact therewith for deflecting material carried on inner surface 24 thereof. As a result, as cleaning media 140 wears in use and as belt 20 deflects, power arm 230, which is rotatable about axis 226 either alone or with support tube 210, rotates to lower V-plow 110 so that cleaning media 140 is maintained in contact with surface 24 of belt 20, e.g., by gravity. When cleaning media 140 is worn to the extent that strut 232 of power arm 230 hangs vertically, V-plow 110 can move no further vertically (downward) and arms 120 and media holders 130 preferably are not in contact with belt 20, e.g., they may be about ¼ inch away from surface 24 of belt 20. As cleaning media 140 wears in use, tethers 250 go from a slack condition to being in tension (taught) to support the rearward ends so that frame arms 120 and media holders 130 do not contact belt 20, e.g., they may be about ¼ inch away from surface 24 of belt 20.

Cleaning media 140 may be of any suitable flexible material that will deflect material carried on belt 20 that is to be removed, and be flexible so as to allow the folding of V-plow 110 or the adjusting of the "vee" angle thereof. Suitable materials include, for example, rubber, SBR rubber, urethane, UHMW urethane, and the like, or even a soft metal that will wear without damaging belt 20, e.g., a copper, aluminum or brass. Fasteners 150 may be clevis pins 152 and hair clip pins 153, or could be bolts 154 and nuts 155, e.g., as shown in FIGS. 3 and 4.

The arms 120 of V-plow 110 may be pivoted at apex 114 to be positioned at various angles A, and may be fixed at selected angles A by attaching angle holder 160 to arms 120. To this end, arms 120 have respective holes 123a, 123b near the rearward ends thereof into which a bolt, e.g., eye bolt 252, may be placed, and angle holder 160 has a series of holes 162a, 162b, 162c, respectively, in order moving away from each end of angle holder 160. Angle A is the angle included between frame arms 120 and angle B is a deflection angle or a plowing angle at which each arm 120 is rotated rearward from the transverse direction of support tube 210. Angles A and B are related by the equation: $A°+2B°=180°$. Typically, a deflection angle B may be selected which determines the included angle A.

For example, if eye bolts 252 pass through respective holes 123a and 162a, then arms 120 will be at an included angle A of about a 90° and each arm will be at a plowing angle B of about 45°. In such case, the rearward ends of arms 120 of a V-plow 110 designated for 36-inch wide belts will be separated by a distance suitable for cleaning a belt 20 having a width of about 36 inches. For another example, if eye bolts 252 pass through respective holes 123a and 162b, then arms 120 will be at an included angle A of about a 74° and each arm will be at a plowing angle B of about 53°. In such case, the rearward ends of arms 120 of a V-plow 110 designated for 36-inch wide belts will be separated by a distance suitable for cleaning a belt 20 having a width of about 30 inches. For yet another example, if eye bolts 252 pass through respective holes 123a and 162c, then arms 120 will be at an included angle A of about a 58° and each arm will be at a plowing angle B of about 61°. In such case, the rearward ends of arms 120 of a V-plow 110 designated for 36-inch wide belts will be separated by a distance suitable for cleaning a belt 20 having a width of about 24 inches.

Adjustment of the angles A, B is facilitated by a pivot, e.g., by a hinge 114 which has a pair of hinge leaves 116 that are respectively fastened to frame arms 120, and are joined by hinge pin 118 which allows the relative angular position of frame arms 120 to be changed. Optionally, hinge 114 may include a torsion spring for urging frame arms 120 outward, thereby to keep arms 120 spread apart for efficient belt cleaning, and also to assist spreading arms 120 for installation. Specifically, frame arms 120 may be adjusted to a desired angle and fixed there by angle holder 160 as described.

In addition, hinge 114 allows frame arms 120 to be pivoted to include any desired angle A, of which one example is to pivot arms 120 to include a small angle A so that they are more compact and therefore easier to handle, e.g., for shipment, installation and removal. For example, it may be awkward and/or difficult to move a relatively large, heavy V-plow 110 through the limited clearance opening between conveyor frame 40 and belt 20 and for installation personnel to enter or reach into such limited clearance space to install, remove and work on V-plow 110. Thus, it is desirable that arms 120 be pivotable to a small included angle A, e.g., an angle of about 0° or other small angle so that they are substantially or almost parallel, and may more easily fit through a small opening or into a small space.

Base plate 240 mounts to connect the two arms 120 at apex 112, and preferably may have slotted holes through which bolts 242 pass, thereby to allow some relative movement when V-plow is bent to change the angle A included between arms 120. Thus, base plate 240 may be utilized with V-plows 110 of different widths. Base plate 240 preferably covers or shields the space remaining between the forward ends of arms 120 to reduce the entry of dirt and debris, e.g., fugitive material, therein. In addition, base plate 240 also tends to shield hinge 114, particularly hinge pin 118, from such dirt and debris, e.g., fugitive material. If desired, base plate 240 may extend further rearward than is illustrated in FIG. 3 so as to better shield hinge 114.

V-plow 110 is illustrated as being engaged in cleaning and protecting the inner side 24 of a return run of conveyor belt 20. V-plow 110 has a rigid frame 120 which may be made up of one or more elements or arms 120. Frame 110 has a first arm 120 and a second arm 120 that are joined together at an apex 112 that is adjustable to vary the angle A between the first and second arms 120. The adjustable apex 112 may include a variety of hinges 114 or other components for varying the angle between the first and second arms 120, including but not limited to pivot pins and compression springs. The apex 112 may include a torsion spring hinge 114 that is operable to deflect in response to force applied inwardly or outwardly on the arms 120 to decrease or increase the angle A between the arms 120.

Conveyor belt 20 has an exterior or carry side 22 that receives material from a loading area, and an interior or reverse side 24 that engages a pulley system. The carry side 22 has a belt surface 22 for carrying material on conveyor system 10.

Apex hinge 114 at the apex of the V-plow 110 as seen in FIG. 3 allows for the plow 110 to assume various angles A, B. By having the capability of assuming many different angles, a user can use the plow 110 on different belt widths without purchasing another unit. In addition, the hinged element 114 allows for easier shipment and installation, because V-plow 110 may be folded so that the rear faces thereof are substantially adjacent. As can be seen in FIG. 4, there is a limited clearance between belt 20 and conveyor framework 40 which could make installation of prior art fixed angle V-plows very difficult, but which is thought to be easier with a folded hinged V-plow arrangement 110.

V-plow 110 is held in place by a power arm or adjustor arm 230 having a first end that is connected to a mounting tube 210 which is held up by mounting brackets 220 that are, e.g., welded or bolted to the conveyor frame 40. The mounting tube 210 is substantially prevented from sliding axially in the brackets 220 by a lock collar 222 on each end of tube 210. A second end of power arm 230 is mounted on a base plate 240 on the V-plow frame 120. Power arm 230 may be connected to base plate 240 with a variety of fasteners or couplings, e.g., with a power arm bolt and power arm nut 244. Base plate 240 is connected to the V-plow frame 120 by a base plate bolt and a base plate nut 242. Power arm 230 allows V-plow 110 to move in the direction which belt 20 is deflecting. For example, if belt 20 is moving vertically, plow 110 can then move vertically along with it. This insures consistent cleaning and protection of belt 20, regardless of vertical deflection, with V-plow 110 engaging belt 20 by the force of gravity.

Because V-plow 110 is designed with an adjustable apex 114 to allow for various angles, an angle holder 160 may be used to keep the angle fixed. Angle holder 160 may be attached to the plow's arms 120 by I-bolts and I-bolt nuts 252. I-bolts 252 are connected to one or more tethers 250 via a quick connect 254 for easy installation and removal. Tethers 250 can be made from chain, rope, metal braided wire, or other materials having tensile strength. Tethers 250 are preferably installed to lean towards the apex 112 end of V-plow 110 at an about 45° angle when taught, and slightly outward from belt 20.

V-plow apparatus 100 permits consistent removal of carry back and other fugitive materials that land on or accumulate on the reverse side 24 of conveyor belt 20. As noted above, V-plow 110 includes a frame having a first arm 120 and a second arm 120 connected with first arm 120, forming a plow angle. Cleaning media 140 is connected to frame 120 and held in engagement with belt 20. A pivot connection 240, 242 between first and second plow arms 120 allows adjustment of the plow angle. In this arrangement, the width of the plow frame 120 can be custom fit and adjusted to conform to the width of conveyor belt 20.

The center section or apex 112 of V-plow 110 is generally pointed in the direction opposite the direction in which the reverse side 24 of belt 20 travels. In this arrangement, V-plow 110 acts as a wedge to drive material 12 on belt 20 toward the side edges of belt 20. In operation, material 12 on the reverse side 24 of belt 20 collides with V-plow 110 and is trapped against cleaning media 140, while belt 20 passes beneath V-plow 110. As belt 20 continues to pass beneath V-plow 110, the material 12 trapped against the V-plow 110 travels laterally along arms 120 toward the outer edges of V-plow 110. As more material 12 accumulates along V-plow 110, the material 12 at the outer edges of V-plow 110 is pushed off of the sides of belt 20, preventing material 12 from passing between tail pulley 30 and belt 20.

During operation of belt 20, the weight of V-plow 110 holds V-plow 110 in firm engagement against the reverse side 24 of belt 20. V-plow 110 is supported on an interactive suspension system 200 that responds to movement of belt 20 to ensure that V-plow 110 remains firmly engaged against belt 20. Suspension system 200 includes a power arm 230, described earlier, which moves in response to vertical and horizontal displacement of V-plow 110. Power arm 230 pivots to permit cleaning media 140 to move in a direction normal to belt 20 and in a direction parallel to the direction of travel of belt 20. In the event that belt 20 loses tension and begins to sag downwardly, pivoting power arm 230 allows V-plow 110 to move downwardly with belt 20 to maintain constant engagement between cleaning media 140 and the reverse side 24 of belt 20. In the event that tension increases in belt 20, power arm 230 pivots to allow V-plow 110 to rise with belt 20 to maintain the same degree of engagement with belt 20.

Interactive suspension system 200 also adjusts the engagement between V-plow 110 and belt 20 when the edge of cleaning media 140 wears down. Over time, the edge of cleaning media 140 in contact with belt 20 can break down and wear away. If no adjustments are made, the edge of cleaning media 140 will eventually lose contact with the surface 24 of belt 20, allowing material 12 to pass under V-plow 110. Power arm 230 of suspension system 200 adjusts for any wearing on cleaning media 140 and for any sag or deflection of belt 20 by allowing V-plow 110 to move normal to the surface 24 of belt 20 and parallel to the surface of belt 20 to apply a constant force against belt 20 due to gravity. This maintains a constant engagement between cleaning media 140 and the reverse side 24 of belt 20.

Pivot connection 240, 242 between first and second plow arms 120 allows the plow angle A to be adjusted to any desired angle. For example, first and second plow arms 120 may be adjusted to form a 0 degree angle (i.e. parallel alignment) to allow for compact storage and shipping of V-plow 110. Pivot connection 240, 242 may also be adjusted to a small angle to allow easy installation of V-plow 110. Many conveyor belts 10 have very little clearance space between the belt runs and the structural components on frame 40 that support conveyor belt 20. Pivot connection 240, 242 allows arms 120 to be adjusted so that arms 120 are parallel (or separated by a small angle) so that V-plow 110 can fit through narrow clearances between belt 20 and support frame 40.

Figure 5:
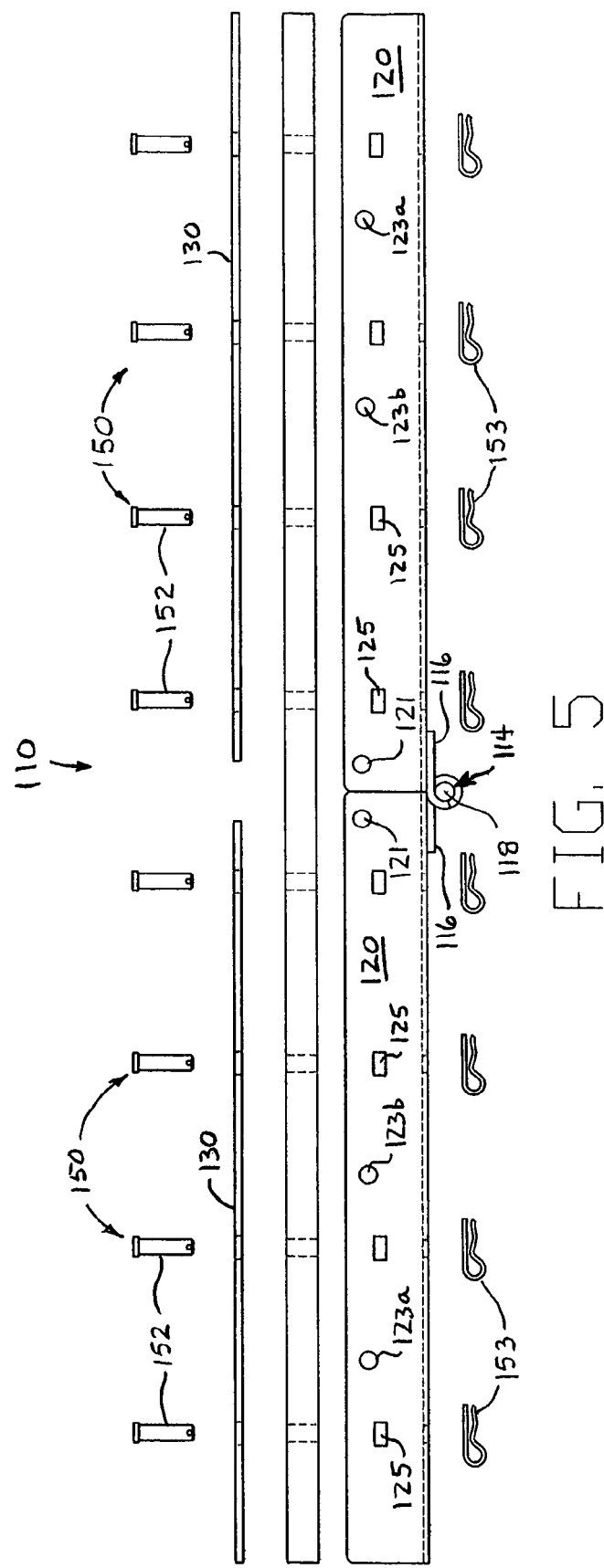
FIG. 5 is an exploded view of the example embodiment of a V-plow apparatus illustrating components thereof, including the frame arms, cleaning media, cleaning media holders, and attachment parts.

FIG. 5 is an exploded view of the example embodiment of a V-plow apparatus 110 illustrating components thereof, including frame arms 120, cleaning media 140, cleaning media holders 130, and attachment parts 150. Specifically, frame arms 120 are fully rotated outward about apex hinge 114 and may be said to be "laid out" so that cleaning media 140 is no longer bent at apex 112, as would be convenient and desirable for removing, installing and replacing cleaning media 140. Cleaning media 140 is between frame arms 120 and cleaning media holders 130, and respective holes through cleaning media holders 130, cleaning media 140 and frame arms 120 are aligned for receiving fasteners 150, such as clevis pins 152 therethrough. Hair pin clips 153 secure installed clevis pins 152 in place.

Frame arms 120 also have holes 121 near the forward ends thereof for the mounting of base plate 140, which may be removed, as illustrated, for easing the installation, removal and/or replacement of cleaning media 140. Frame arms 120 also have respective holes 123a through which eye bolts 252 may be installed for attaching tethers 250. Holes 123a, 123b may also be utilized for attaching angle holder 160. Holes 125 are also aligned with the locations of clevis pins 152 so that a media compression tool may be inserted therethrough for use as a lever for pressing against clevis pin 152 for compressing cleaning media 140 for ease of installation and removal thereof, as described below. Holes 125 may be of a shape corresponding to that of the media compression tool, e.g., a rectangular hole for a media compression tool having a rectangular cross-section.

Figure 6:
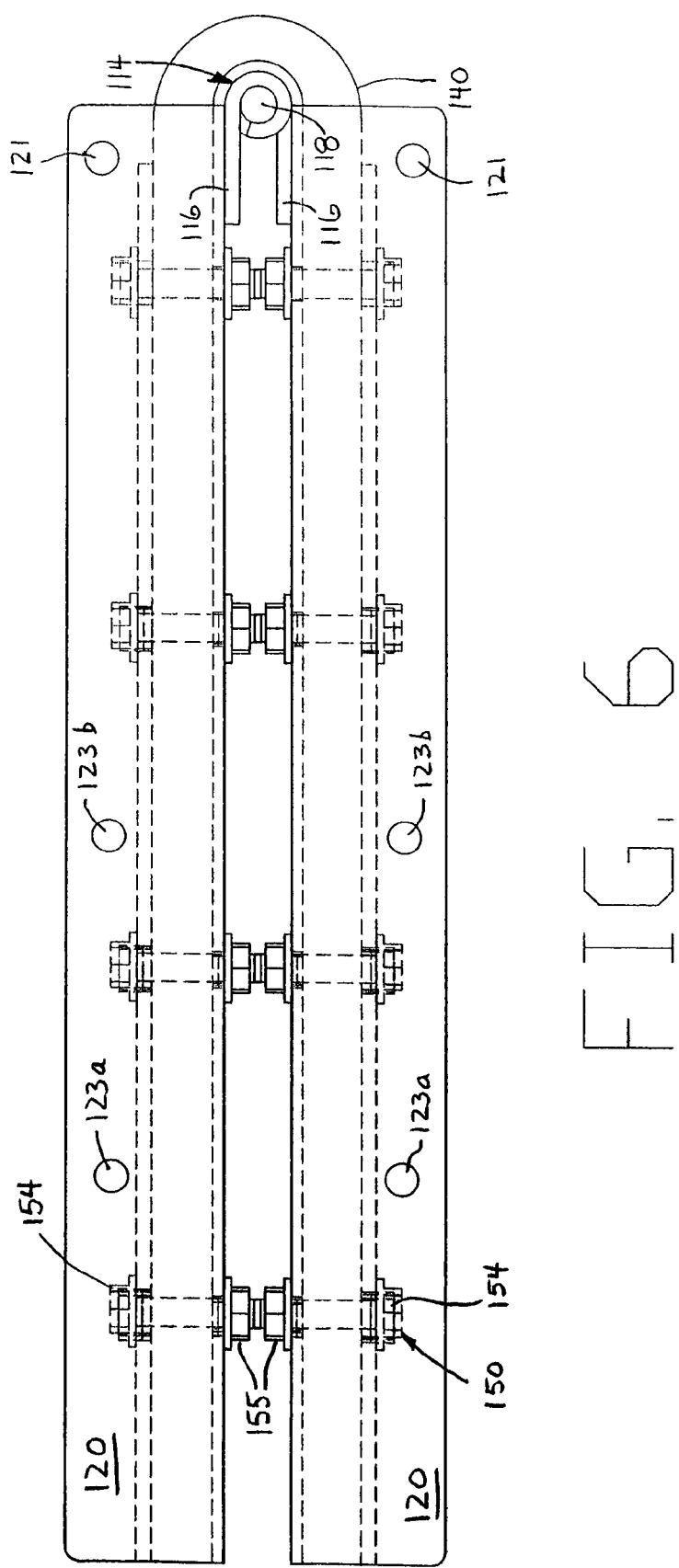
FIG. 6 is a top view the example embodiment of a V-plow apparatus in a partially assembled configuration.

FIG. 6 is a top view the example embodiment of a V-plow apparatus 110 in a partially assembled configuration. The partial assembly includes frame arms 120, media holders 130, cleaning media 140 and fasteners 150, and does not include angle holder 160 and elements of plow support 200 such as base plate 240 and power arm 230.

Specifically, frame arms 120 are pivotably attached by apex hinge 114 which has hinge leaves 116 respectively attached to frame arms 120 and is pivotable about hinge pin 118. Cleaning media 140 is installed on frame arms 120 (preferably before frame arms 120 are folded into the illustrated position) and is supported thereon and compressed by media holders 130 which are secured in place by fasteners 150, e.g., bolts 154 and nuts 155.

In the illustrated folded position, frame arms 120 are substantially parallel, e.g., the included angle A is or is close to 0°, which is a compact arrangement suitable for packaging and shipping. This folded position is also convenient for positioning the illustrated partial assembly in a conveyor system 10, e.g., for installation and/or removal.

FIGS. 7A through 7E are end views of the example embodiment of a V-plow apparatus 110 in the folded configuration illustrating steps in the removal of a cleaning media 140 from the V-plow frame 120 and in the attachment of the cleaning media 140 thereto.

Figure 7A:
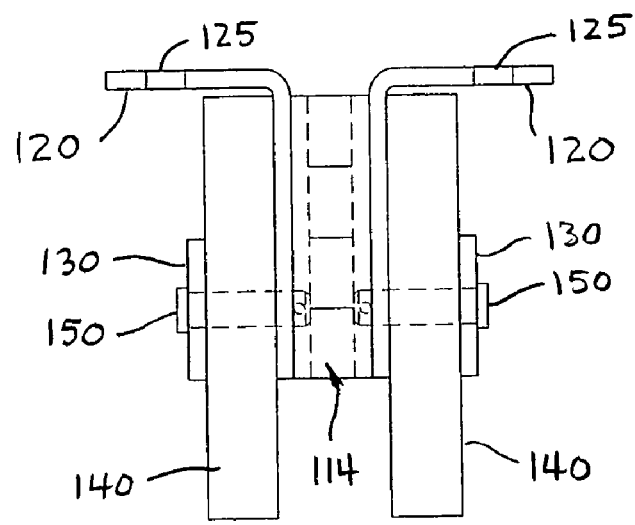
FIGS. 7A through 7E are end views of the example embodiment of a V-plow apparatus in the folded configuration illustrating steps in the removal of a cleaning media from the V-plow frame and in the attachment of the cleaning media thereto.

Cleaning media 140 is supported on V-plow frame 120 by a cleaning media holder 130 which secures using fasteners 150 a central portion of cleaning media 140 to the frame 120 including two arms 120 joined at the apex by a hinge 114. Cleaning media 140 is preferably supported on frame 120 so that a substantial portion of its wear height, i.e the dimension perpendicular to surface 24 of belt 20, hangs beneath the bottoms of frame 120 and media holder 130, as illustrated in FIG. 7A for an unused cleaning media 140. In this arrangement, the cleaning media 140 engages the reverse side 24 of belt 20, while the bottom edges of frame 120 and media holder 130 are supported well above the belt surface 24. This allows cleaning media 140 to engage the belt for extended periods, while preventing frame 120 and media holder 130 from gouging or otherwise contacting belt 20.

A typical example cleaning media 140 is about six inches in height (the wear dimension which is perpendicular to belt 20) and is about one inch thick (between media holder 130 and frame arm 140), and has a length selected for the particular angles A, B to which frame arms 120 will be set. In a typical instance, the initial distance between belt 20 and the bottoms of frame arms 130 and media holders 130 is over two inches, i.e. more than one-third of the initial wear distance of an unworn six-inch cleaning media 140. The maximum wear distance is limited by the thickness of cleaning media 140 and the characteristics of its interface with belt 20. Thus, a reversible cleaning media 140 of six-inch height may provide about 3½ inches of wear depth, e.g., about 55-60% of its six-inch height, which is substantially more than could be provided by a cleaning media that is not reversible.

A typical example cleaning media 140 for use with a 24-inch wide conveyor belt may be about 30 inches long, for use with a 30-inch wide conveyor belt may be about 41¾ inches long, for use with a 36-inch wide conveyor belt may be about 50¼ inches long. Cleaning media 140 may be provided in specific lengths or may be cut to length in the field, as may be desirable.

Figure 7B:
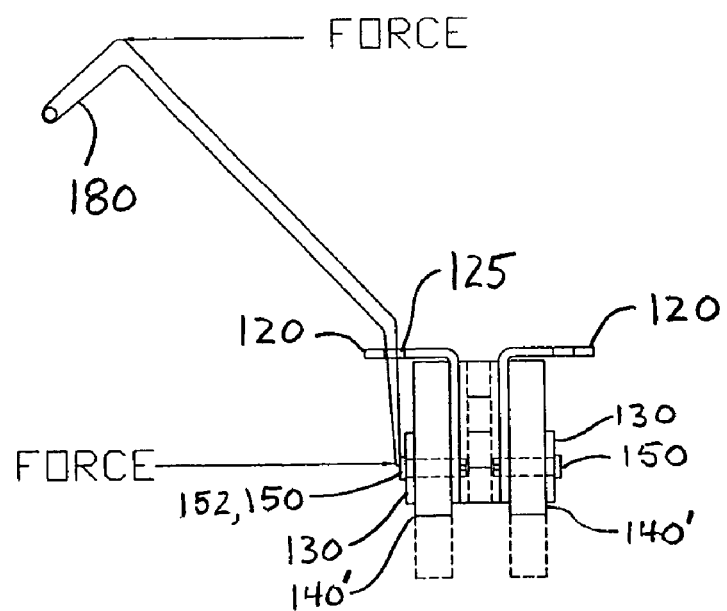

Eventually, the edge of the cleaning media 140 that engages belt 20 may wear away to such a degree that the wear edge thereof becomes aligned with or close to the bottom edges of the frame 120 and media holder 130, as shown in FIG. 7B. If the V-plow 110 were to be operated in this condition with a worn cleaning media 140', the bottom edges of the frame 120 and media holder 130 could contact the reverse side 24 of belt 20 and possibly cause damage to belt 20. This is preferably avoided by support 200 be adjusted to maintain about ¼-inch minimum clearance between frame arms 120 and belt 20. The worn-away portion of cleaning media 140' is shown by dashed lines.

To remove worn cleaning media 140', a media compression tool 180 may be inserted through hole 125 in arm 120 with the end thereof against the head of clevis pin 152. Compression tool 180 may be pressed in the direction shown by the arrow "FORCE" thereby to apply by a lever action force against the head of clevis pin 150, 152 to compress flexible cleaning media 140' so as to make removal of hairpin clip 153 from clevis pin 152 easier.

Figure 7C:
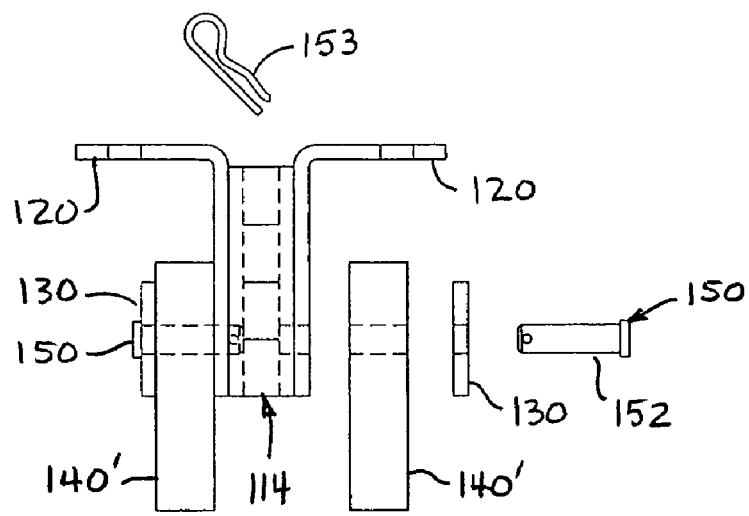

With pins 153 removed from all of clevis pins 152, clevis pins 152 may be withdrawn and media holder 130 and media 140' will be free from arm 120, as shown in FIG. 7C. The arrangement of frame arm 120 and cleaning media holder 130 permits the worn cleaning media 140' to be reversed or inverted so that the worn edge thereof is away from belt 20 and is replaced with the unused edge of cleaning media 140', as shown in FIG. 7C. That is, cleaning media 140 is reversible on V-plow 110 frame 120 so that the unused edge of cleaning media 140' can be positioned against belt 20. This arrangement extends the useful life of cleaning media 140, and lowers costs and labor associated with obtaining and stocking replacement cleaning media 140.

Figure 7D:
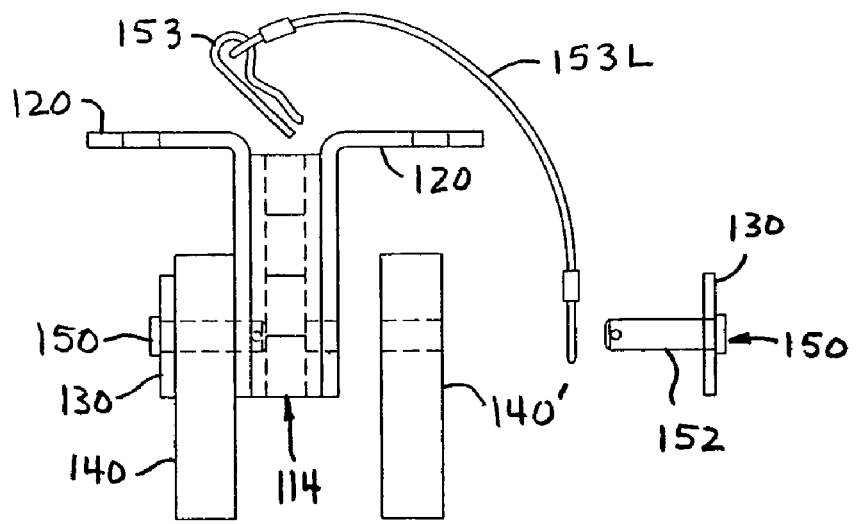

Optionally, clevis pins 153 may be permanently affixed to media holder 130, as shown in FIG. 7D, such as by welding so that individual clevis pins need not be handled and thus are not likely to be misplaced, dropped or lost. Also optionally, a lanyard 153L may be employed for tethering hair pin clips 153 to respective clevis pins 152 so that hair pin clips 153 are less likely to be misplaced, dropped or lost. Typically lanyard 153L has a loop at each end, one loop for holding a clevis pin 152 and the other loop for holding a hair pin clip 153.

Figure 7E:
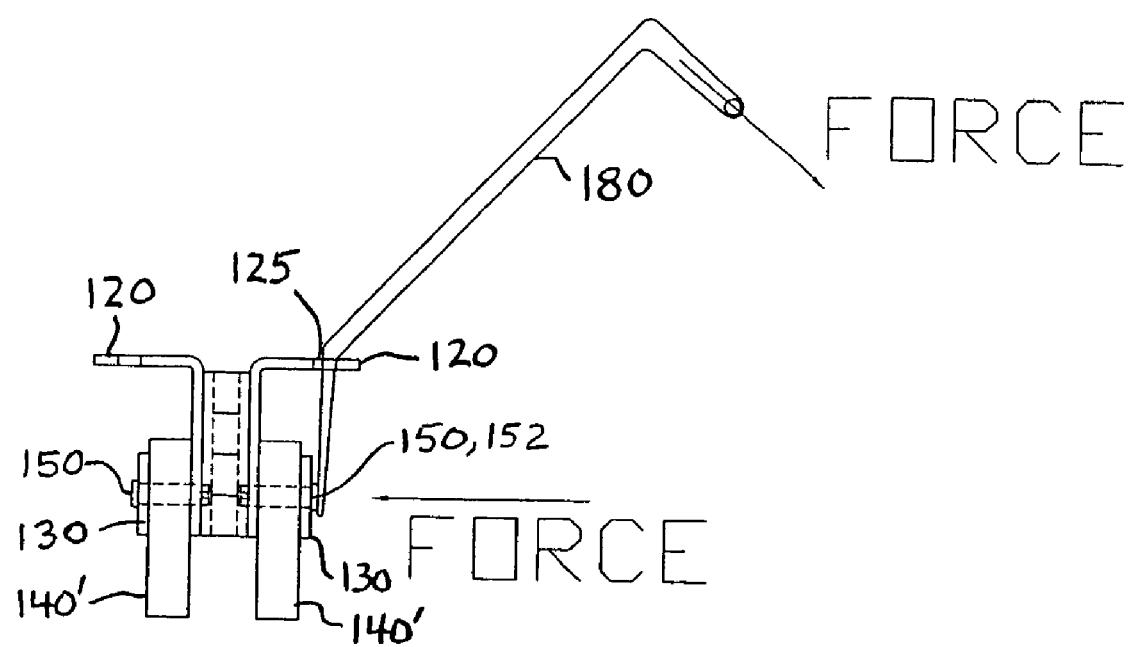

After worn cleaning media 140' is removed and is inverted, it may be reattached to frame arm 120 by reversing the removal procedure. To attach cleaning media 140 or worn cleaning media 140', clevis pins 152 are inserted through respective holes in media holder 130, in cleaning media 140' and in frame arm 120. Media compression tool 180 is again positioned through hole 125 in arm 120 and force is applied thereto to apply force to the head of clevis pin 152 so as to compress cleaning media 140, as shown in FIG. 7E. With cleaning media 140' compressed, hair pin clips 153 may be inserted with relative ease to secure clevis pins 152 in place for holding cleaning media 140' securely to frame arm 120. Release of the force applied to compression tool 180 allows cleaning media 140' to expand to tension cleaning media 140 between frame arm 120 and media holder 130.

Preferably, cleaning media holder 130 is secured to frame 120 with quick-release fasteners 150, such as clevis pins 152 and hair pin clips 153, to allow cleaning media 140 to be installed, removed and inverted relatively quickly and easily. However, other fasteners may be employed.

The views of FIGS. 7A-7E also show media holders 130 which are held in place by clevis pins 152. Although in some cases a customer may want media holders 130 that do not have clevis pins 152 welded to media holder 130, a preferred method of mounting the media holders 130 has clevis pins 152 welded to media holder 130 such as shown in FIG. 7D. Clevis pins 152 are held snugly in place by hairpin clips 153. Clevis pins 152 typically have a predetermined length so that when assembled with cleaning media 140 and media holder 130, cleaning media 140 is held snugly in place. Others may prefer bolts 154 and nuts 155 for snugly securing cleaning media 140 an media holder 130 to frame arm 120. Cleaning media 140 is preferably held snugly against the plow's arms 120 because, if the media 120 were loose, the vibration from the belt 20 running could eventually make parts on the plow 110 fail.

With the use of a predetermined height of cleaning media 140 and the ease of disassembly, the cleaning media 140 can be rotated or inverted 180°. This rotation will allow for the utilization of the upper top portion of the media 140. The top of the plow's arms 120 may include rectangular holes 125 that can serve as a convenient place to insert media compression tool 180. Holes 125 are at the same spacing as the holes therein that receive clevis pins 152, and each hole 125 is aligned with a hole for a clevis pin 152.

Figure 8:
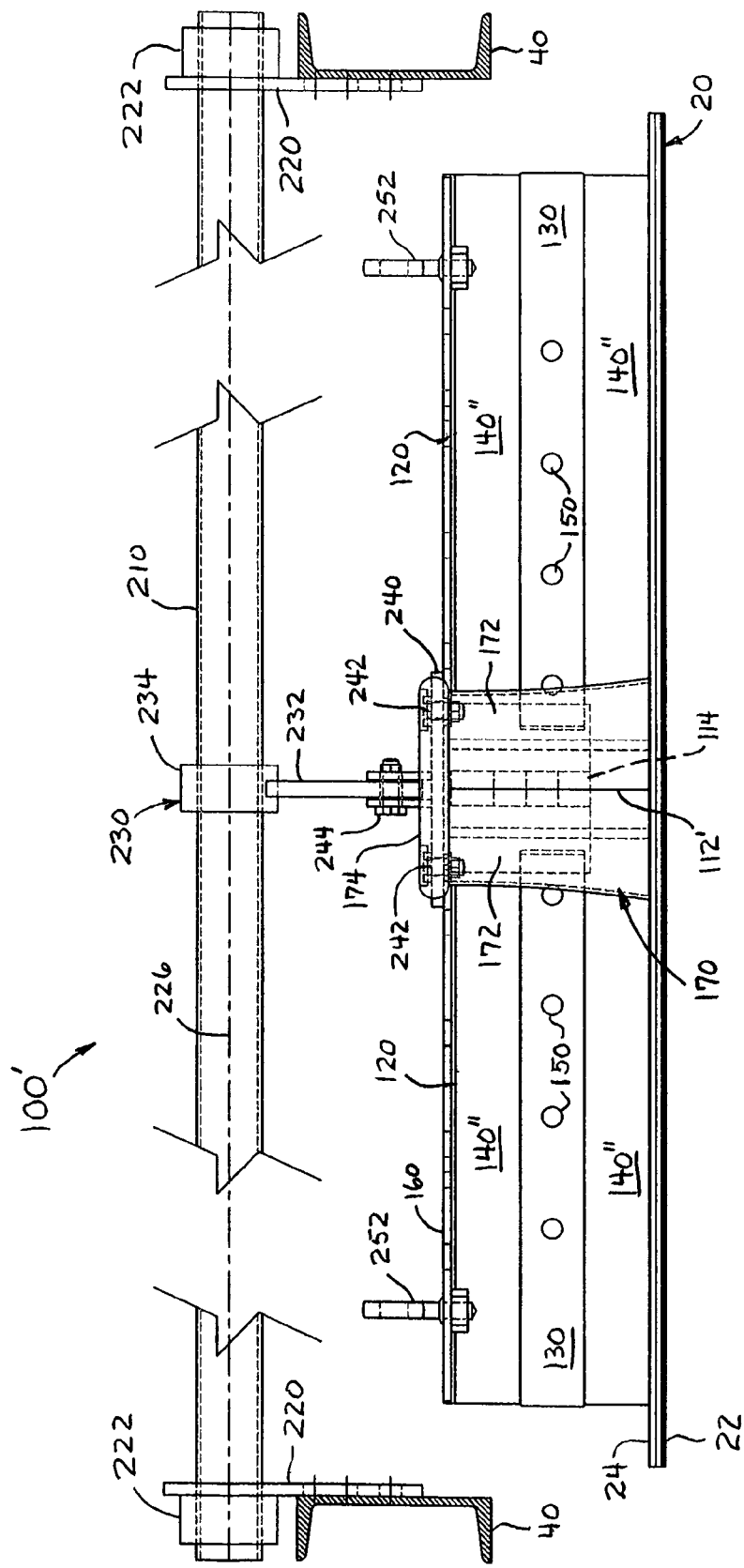
FIG. 8 is a front view of an example embodiment of a V-plow apparatus having a nose cap at the apex thereof.
Figure 9:
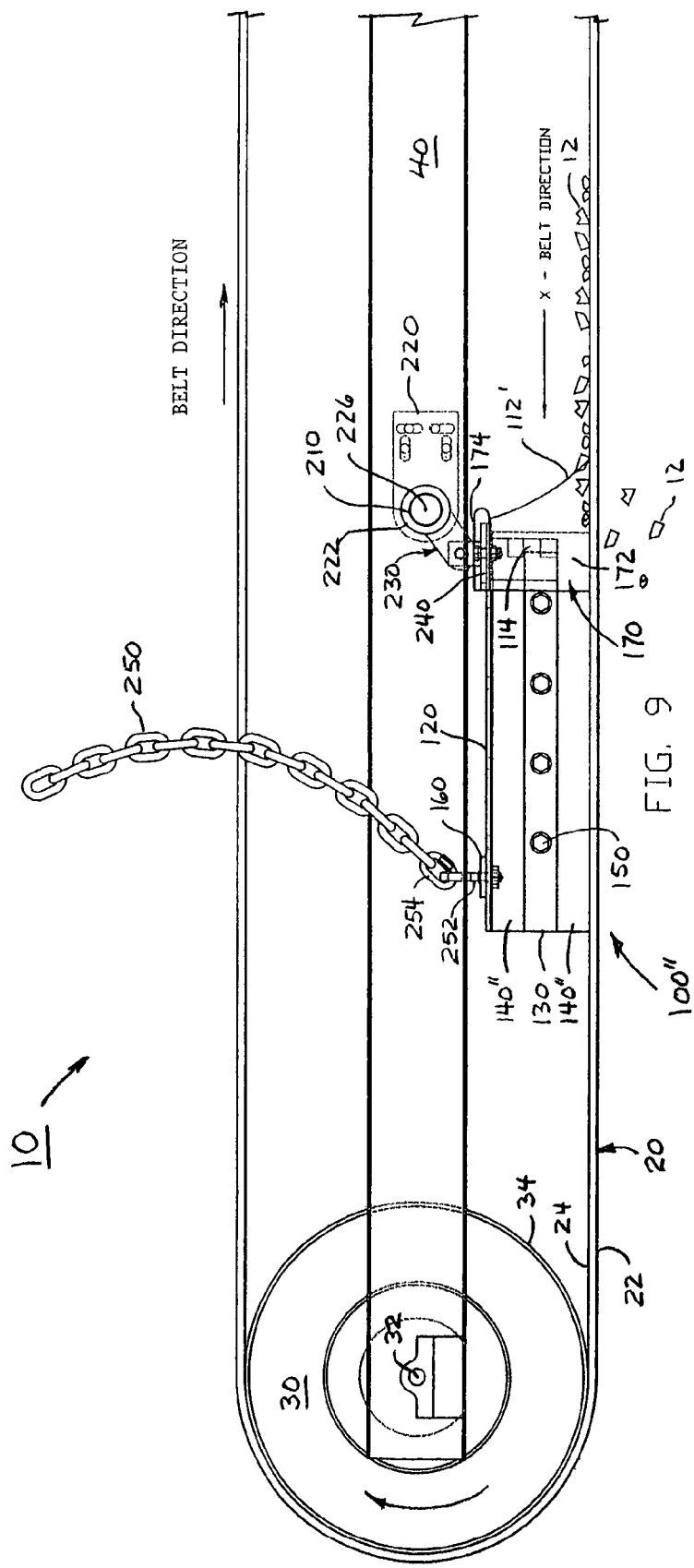
FIG. 9 is a side view of an example conveyor system and the example embodiment of a V-plow apparatus having a nose cap on a conveyor belt.

FIG. 8 is a front view of an example embodiment of a V-plow apparatus 100' having a nose cap 170 at the apex thereof, and FIG. 9 is a side view of an example conveyor system 10 and the example adjustable V-plow apparatus 100' having a nose cap 170 on a conveyor belt 20. Adjustable V-plow arrangement 100' is substantially similar to adjustable V-plow arrangement 100, except for the addition of nose cap 170 and the modification of cleaning media 140" as illustrated, and is supported by a plow support, e.g., as described above.

A nose cap 170 may be desired where a nose or apex 112' of a different shape is desired, or where a different material characteristic than that of cleaning media 140 is desired, to be presented to oncoming material 12. For example, nose cap 170 has forward facing sides 172 that are shaped to provide a relatively sharply pointed, e.g., sharp, leading edge or apex 112'. Apex 112' may be similar in shape to the prow or bow of a ship hull, rather than have the rounded relatively blunt shape of cleaning media 140 described above. Apex 112' may be inclined rearward so that material 12 on belt 20 is cast upward and to the sides to reduce the tendency of material to build up or clog at apex 112'. The angle between sides 172 may be smaller or larger than the included angle between frame arms 120 of V-plow 110, and sides 172 may be shaped so as to provide different angles at different locations thereon.

Nose cap 170 may be of a material having different characteristics than the typically rubber cleaning media 140. For example, a polyurethane nose cap 170, which is harder than rubber, can provide a leading edge that is believed to provide and maintain a clean and crisp edge for better cleaning and deflection of material 12.

The rear of nose cap 170 has a recess shaped for receiving the forward ends of angled frame arms 120 and cleaning media 140" attached thereto. The top 174 of nose cap 170 may overlie base plate 240 and may be fastened in place by bolts 242 that fasten base plate 240 to frame arms 120. Top 174 is preferably shaped so as to shield pivot hinge 114 from dirt and debris, in similar manner to base plate 240.

Figure 10:
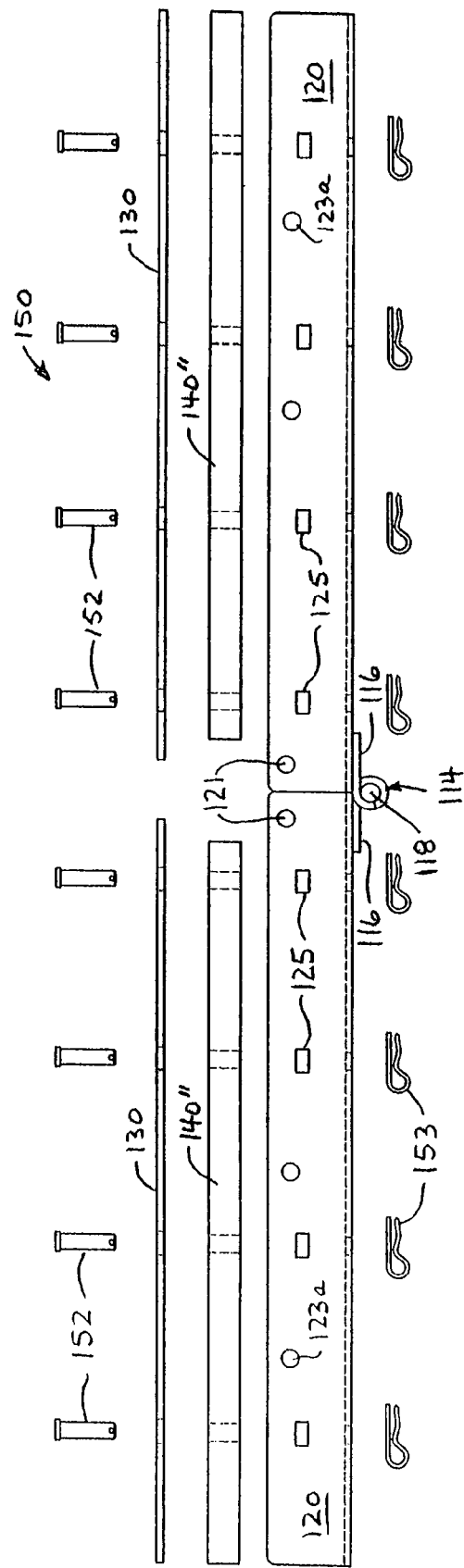
FIG. 10 is an exploded view of the example embodiment of a V-plow apparatus of FIGS. 8 and 9 illustrating components thereof, including frame arms, a cleaning media having two parts for use with a nose cap, cleaning media supports, and attachment parts.

FIG. 10 is an exploded view of the example embodiment of a V-plow apparatus 110' of FIGS. 8 and 9 illustrating components thereof, including frame arms 120, a cleaning media having two parts 140" for use with a nose cap 170, cleaning media supports 130, and attachment parts 150. In this example a polyurethane nose cap 170 can be provided if it is desired that cleaning media 140 have a crisper edge for cleaning and protecting belt 20 than is provided by commonly used cleaning media 140 materials.

Specifically, frame arms 120 are fully rotated outward about apex hinge 114 and may be said to be "laid out," as would be convenient and desirable for removing, installing and replacing cleaning media 140". Respective cleaning media 140" are between the respective frame arms 120 and cleaning media holders 130, and respective holes through cleaning media holders 130, cleaning media 140" and frame arms 120 are aligned for receiving fasteners 150, such as clevis pins 152 therethrough. Hair pin clips 153 secure installed clevis pins 152 in place.

Frame arms 120 also have holes 121 near the forward ends thereof for the mounting of base plate 240, which may be removed along with nose cap 170, as illustrated, for easing the installation, removal and/or replacement of cleaning media 140". Frame arms 120 also have respective holes 123a through which eye bolts 252 may be installed for attaching tethers 250. Holes 123a, 123b may also be utilized for attaching angle holder 160. Holes 125 are also aligned with the locations of clevis pins 152 so that a media compression tool 170 may be inserted therethrough for use as a lever for pressing against clevis pin 152 for compressing cleaning media 140" for ease of installation and removal thereof, in similar manner to that described above in relation to FIGS. 7A-7E. Holes 125 may be of a shape corresponding to that of the media compression tool 170, e.g., a rectangular hole for a media compression tool having a rectangular cross-section.

Cleaning media 140, 140" may be formed of a rubber elastomer or styrene-butadiene rubber (SBR). The cleaning media 140 can be made as one continuous piece 140 or as separate pieces 140" to accommodate the front nose cap 170. This specially designed nose cap 170 can be made from various elastomeric compounds, but the preferred is polyurethane, which typically will provide a continuous crisp cleaning edge.

It is noted that the present arrangement 100 need only deflect some of the material carried on a belt to be useful, e.g., such as deflecting relatively larger pieces of such material while not deflecting or incompletely deflecting relatively smaller pieces. In the use described, that might entail deflecting away pieces of material that are large enough to damage tail pulley 30 or belt 20 if they were to remain on belt 20 as it passes around pulley 30, while some or all of smaller pieces that are unlikely to damage pulley 30 or belt 20 may get past V-plow 110 without being deflected. The arrangement of V-plow 100, 110 as described could also be employed to perform cleaning or scraping of a belt 20, e.g., possibly with a different cleaning media 140, with a cleaning media 140 of a different material, or with a different mounting 200.

It is also noted that V-plow 110 may reduce the build up of material on the conveyor pulleys which could cause belt mis-alignment and other problems U.S. Provisional Application No. 60/660,644 entitled "Belt Cleaning Apparatus" that was filed on Mar. 11, 2005, is hereby incorporated herein by reference in its entirety.

The described hinged V-plow 110 arrangement may have a variety of configurations that feature any one or more of the following features:

- Hinged element 114 at apex 112 where two arms 120 come together.
- Clevis pins 152 for easy cleaning media 140 change out.
- Media holder 130 which helps in holding media 40 against plow arms 120.
- Media removal tool 180 which allows for pushing in on the head of clevis pin 152 to compress pin 152 inwards to aid in installing or removing hair pin clips 153.
- Clevis pins 152 welded to media holder 130 for easier attachment of media 140 to plow arms 120.
- Hair pin clips 153 are utilized to hold clevis pins 152 in place.
- Lanyards 153L to attach to plow 110 clevis pins 152 so that hair pin clips 153 can be attached.
- Angle holder 160 which allows for various angles because of it's predefined holes 162a-162c.
- I-bolts (eye bolts) 252 which hold angle holder 160 in place on top of plow arms 120.
- Tethers 250 which connect to the I-bolts 252 so that the plow 110 can be secured to conveyor framework 40 to aid in keeping plow 110 in the same general position.
- Mounting brackets 220 which mount to the conveyor framework 40 via bolts or welding.
- Mounting tube 210 which slides into mounting brackets 220 and is secured by outer collars 222 to stop longitudinal movement.
- Power arm 230 which is attached to the mounting tube 210 and is stabilized from longitudinal movement by setscrews.
- Base plate 240 which attaches power arm 230 to the top of plow arms 120 by bolts, washers, and nuts 242.

With the above, the hinged V-plow 110 plow can easily move up and down with the deflection of the belt and so may have better performance.

Optionally, a safety chain (tether) can be supplied and attached to base plate 240 or power arm 230 so that the V-plow 110 will be secured in place and will not be free to move towards the tail pulley 30 in the event the front support structure 210, 220, 230 should fail.

An apparatus 100 for removing material and debris from the inner surface 24 of a conveyor belt 20 may comprise a plow frame 110 having a first arm 120 and a second arm 120 connected with the first arm 120, the first and second arms 120 forming a plow angle, a pivot connection 114 between the first and second plow arms 120 for adjusting the plow angle so that the width of the plow frame 110 conforms to the width of the conveyor belt 20, an angle holder 160 detachably connected with the first and second plow arms 120 to maintain the plow angle in a fixed arrangement, and cleaning media 140 attached to the plow frame 110 for engaging the inner surface 24 of the belt 20 to remove material and debris from the belt 20. The cleaning media 140 may comprise a first edge in engagement with the inner surface 24 of the conveyor belt 20, and a second edge out of engagement with the belt 20. A cleaning media holder 130 may be detachably connected with the frame 110 for securing the cleaning media 140 to the frame 110, and may be invertible on the cleaning media holder 130 to position the second edge in engagement with the inner surface 24 of the belt 20 when the first edge becomes worn or damaged. An adjustor arm 230 may be connected with the frame 110 for displacing the frame 110 in a direction normal to the belt 20, and may be operable to displace the frame 110 in a direction parallel to the direction of belt 20 movement. A tether 250 may be connected with the frame 110 that limits displacement of the frame 110 relative to the conveyor belt 20.

Apparatus 100 for deflecting material from a belt 20 may comprise first and second frame arms 120 pivotably connected together at their respective first ends, a cleaning media 140 mounted to the first frame arm 120 and to the second frame arm 120 for providing a cleaning edge along the first and second frame arms 120 for engaging a belt 20, and a mounting 200 attached to the first and second frame arms 120 proximate the pivotable connection 114 thereof for mounting the first and second frame arms 120 proximate a belt 20. The first and second frame arms 120 may be pivotably connected by a hinge 114 attached thereto proximate the respective first ends thereof, and the hinge may include a torsion spring. An angle holder 160 may be detachably attached to respective second ends of the first and second frame arms 120 for maintaining an angle A therebetween. The apparatus 100 may further comprise first and second media holders 130 attached respectively to the first and second frame arms 120, wherein the cleaning media 140 is mounted between the first frame arm 120 and the first media holder 130 and is mounted between the second frame arm 120 and the second media holder 130 for providing a cleaning edge along the first and second frame arms 120. The first and second media holders 130 may be attached respectively to the first and second frame arms 120 by fasteners 150. The first and second frame arms 120 may each comprise a first and second elongated members joined along respective long edges thereof, each first elongated member having a plurality of holes spaced apart along its length, and the first and second media holders 130 may each comprise an elongated member having a plurality of holes spaced apart along its length in locations corresponding to the holes of the first and second frame arms 120, and the apparatus may further comprise a plurality of fasteners 150 each disposed in corresponding ones of the holes of the first and second frame arms 120 and of the first and second media holders 130, respectively, for mounting the cleaning media 140 therebetween. Fasteners 150 may include pins 152, clevis pins 152, hair clip pins 153, cotter pins 153, bolts 154, bolts 154 and nuts 155, bolts 154 and threaded holes 155, rivets, welds, links, or any combination of any of the foregoing. The second elongated member of each of the first and second frame arms 120 may have a plurality of holes 125 spaced apart along its length in locations corresponding to the holes of first elongated member thereof, and a media compression tool 180 may be insertable through the holes 125 of the second elongated member for applying force to the fasteners 150 mounting the media holders 130 and the cleaning media 140 to the first elongated members of the first and second frame arms 120. Mounting 200 may comprise a base plate 240 attached proximate the first ends of the first and second frame arms 120, and an arm 230 attached at a first end to the base plate 240 and having a second end 234 for attaching to a conveyor system 10, and may further comprise a support tube 210 mountable transversely to a conveyor 10, wherein the second end 234 of the arm 230 is attached to the support tube 210, wherein the support tube 210 is rotatable, or wherein the second end 234 of the arm 230 is rotatable relative to the support tube 210, or wherein the support tube 210 is rotatable and the second end 234 of the arm 230 is rotatable relative to the support tube 210. Apparatus 100 may further comprise a conveyor belt 20 having a center and edges, and having a direction of travel, wherein the arm 230 is positioned transversely substantially near the center of the conveyor belt 20, wherein the pivotable connection 114 between the first and second frame arms 120 faces the direction of travel of the conveyor belt 20 with the cleaning media 140 engaging the conveyor belt 20, and wherein respective second ends of the first and second frame arms 120 are proximate the edges of the conveyor belt 20. Tethers 250 may be provided for supporting the second ends of the first and second frame arms 120, and the arm 230 and the tethers 250 may prevent the first and second frame arms 120 and the first and second media holders 130 from contacting the conveyor belt 20. The mounting 200 may comprise an arm 230 for supporting the first ends of the first and second frame arms 120 and tethers 250 for supporting second ends of the first and second frame arms 120, and the arm 230 and the tethers 250 may prevent the first and second frame arms 120 from contacting the conveyor belt 20. Apparatus 100' may further comprise a nose cap 170 attached proximate the first ends of the first and second frame arms 120 for providing a cleaning edge at an apex 112 of the apparatus 100', and the cleaning media 140 may comprise first and second cleaning media 140", wherein the first cleaning media 140" may be mounted between the first media holder 130 and the first frame arm 120, wherein the second cleaning media 140 may be mounted between the second media holder 130 and the second frame arm 120, and wherein the nose cap 170 may fill any gap between the first and second cleaning media 140". Cleaning media 140 may comprise first and second cleaning media 140", wherein the first cleaning media 140" may be mounted to the first frame arm 120, wherein the second cleaning media 140" may be mounted to second frame arm 120, and wherein a nose cap 170 may fill any gap between the first and second cleaning media 140".

Apparatus 100 for removing material from a belt 20 may comprise a hinged V-plow 110 and a plow support 200. The hinged V-plow 110 may comprise first and second frame arms 120 each comprising first and second elongated members joined along respective long edges thereof, each first elongated member having a plurality of holes spaced apart along its length, a hinge 114 pivotably connecting the first and second frame arms 120 together at respective first ends thereof, wherein the hinge 114 is attached to the respective first elongated member of each of the first and second frame arms 120, an angle holder 160 detachably mounted to respective second ends of the first and second frame arms 120 for maintaining an angle A therebetween, first and second media holders 130 each comprising an elongated member having a plurality of holes spaced apart along its length in locations corresponding to the holes of the first and second frame arms 120, a cleaning media 140 mounted between the first frame arm 120 and the first media holder 130 and mounted between the second frame arm 120 and the second media holder 130 for providing a cleaning edge along the respective first elongated members of the first and second frame arms 120, the cleaning media 140 having a plurality of holes spaced apart along its length in locations corresponding to the holes of the first and second frame arms 120, and a plurality of fasteners 150 each disposed in corresponding ones of the holes of the first and second frame arms 120, of the cleaning media 140 and of the first and second media holders 130, respectively, for mounting the cleaning media 140 to the respective first elongated members of the first and second frame arms 120.

The plow support 200 may comprise a mounting 200 attached to the first and second frame arms 120 proximate the pivotable connection 114 thereof. The mounting 200 may comprise a base plate 240 attached proximate the respective first ends of the first and second frame arms 120, and a power arm 230 attached at a first end to the base plate 240 and a support tube 210 mountable transversely to a conveyor 20, wherein the second end 234 of the power arm 230 is attached to the support tube 210. The support tube 210 may be rotatable, or the second end 234 of power arm 230 may be rotatable relative to support tube 210, or the support tube 210 may be rotatable and the second end 234 of the power arm 230 may be rotatable relative to support tube 210.

Apparatus 100 for removing material from a belt 20 may comprise a hinged V-plow and a plow support 200 for mounting the hinged V-plow proximate a conveyor belt 20. The hinged V-plow 110 may comprise first and second frame arms 120 having a hinge 114 pivotably connecting the first and second frame arms 120 together at respective first ends thereof, and a cleaning media 140 mounted to the first and second frame arms 140 and for providing a cleaning edge along the first and second frame arms 120. The plow support may comprise a base plate 240 attached to the first and second frame arms 120 proximate the pivotable connection 114 thereof, a power arm 230 attached at a first end to the base plate 240, and a support tube 210 mountable transversely to a conveyor 20, wherein the second end 234 of the power arm is attached to the support tube 210. The support tube 210 may be rotatable, or the second end 234 of the power arm 230 may be rotatable relative to support tube 210, or the support tube 210 may be rotatable and the second end of the power arm may be rotatable relative to support tube 210. Tethers 250 may be provided for supporting the first and second frame arms 120, and power arm 230 and tethers 250 may prevent the first and second frame arms 120 from contacting a conveyor belt 20.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that embodiments of very different sizes, shapes and dimensions may employ the described arrangements.

While the present invention has been described in terms of the foregoing example embodiments, variations within the scope and spirit of the present invention as defined by the claims following will be apparent to those skilled in the art. For example, while the example adjustable V-plow apparatus 100 is described in terms of a cleaner or scraper for the inner surface on the return of a conveyor belt, it could be employed in other usages, e.g., such as a primary cleaner or scraper, or as a secondary cleaner or scraper, if desired.

Further, certain elements of V-plow arrangement 100 may be described in a particular manner but need not be limited to the described example element. For example, support tube 210 may be a tube, pipe, bar, rod or other elongated member, and need not be of circular cross-section. Support tube 210 need not be rotatable as described, but collar 234 of power arm 230 may be rotatable on support tube 210 and be held in a desired transverse location by collars, pins, ridges, or other means for preventing sideways movement while allowing rotation.

Further, collars 222 may be adjacent to mounting brackets 220 on the belt-facing side thereof rather than adjacent the outward side thereof as shown. Mounting brackets 220 may be mounted in any convenient orientation that presents the hole therein suitably for receiving and positioning support pipe 210 in relation to conveyor belt 20, e.g., in a vertical orientation as suggested by FIGS. 1 and 2, in a horizontal orientation as suggested by FIGS. 3 and 4, or at an angled orientation. Mounting brackets 220 may be mounted by welding, by bolting, or by another convenient method, to a supporting structure such as frame 40 or other convenient structure.

As a further example, support tethers 250 need not be chains, as illustrated, but could be steel or other cables, links, or even a pin or loop extending from a fixed structure, e.g., side frame 40, that engages a loop or pin of V-plow frame 110, e.g., at the location where eye bolts 252 can be attached. While it is convenient that eyeballs 252 serve the two-fold functions of securing angle holder 160 to arms 120 and of securing tethers 250 thereto, as described, separate bolts or other fasteners could be employed for such functions.

Any fasteners may be the particular type of fastener shown and/or described, or may be any other convenient fastening means, e.g., pins, clevis pins, bolts and nuts, bolts and threaded holes, rivets, welds, links, and the like. Any fastener may include a lock washer, a pin, a cotter pin, a hairpin clip, locking hardware, or other arrangement to prevent loosening in use, e.g., due to vibration and the like.

Where V-plow 110 is utilized in proximity to a winged pulley, it may be desirable to provide an idler roller between V-plow 110 and the winged pulley to reduce vibration of the belt caused by the winged pulley.

Finally, numerical values stated are typical or example values, are not limiting values, and do not preclude substantially larger and/or substantially smaller values. Values in any given embodiment may be substantially larger and/or may be substantially smaller than the example or typical values stated.

What is claimed is:

1. Apparatus for removing material and debris from the surface of a conveyor, comprising:
    a) a plow frame having a first arm and a second arm connected with the first arm, said first and second arms forming a plow angle between the first arm and the second arm;
    b) a pivot connection between the first and second arms for adjusting the plow angle between the first arm and the second arm so that the width of the plow frame conforms substantially to the width of the conveyor;
    c) an angle holder detachably connected with said first and second arms to maintain the plow angle between the first arm and the second arm at an adjusted angle that conforms the width of the plow frame substantially to the width of the conveyor; and
    d) cleaning media attached to said plow frame for engaging the surface of the conveyor to remove material and debris from the conveyor.

2. The apparatus of claim 1 wherein the cleaning media comprises a first edge in engagement with the surface of the conveyor, and a second edge out of engagement with the conveyor.

3. The apparatus of claim 2 comprising a cleaning media holder detachably connected with said plow frame for securing the cleaning media to said plow frame.

4. The apparatus of claim 3, wherein the cleaning media is invertible on the cleaning media holder to position the second edge in engagement with the surface of the conveyor when the first edge becomes worn or damaged.

5. The apparatus of claim 1 comprising an adjustor arm connected with the plow frame for displacing the plow frame in a direction normal to the conveyor.

6. The apparatus of claim 5 wherein the adjustor arm is operable to displace the plow frame in a direction parallel to the direction of conveyor movement.

7. The apparatus of claim 1 comprising a tether connected with the plow frame that limits displacement of the plow frame relative to the conveyor.

8. The apparatus of claim 1 further comprising:
    a mounting attached to said first and second arms proximate the pivotable connection thereof for mounting said first and second arms proximate a conveyor.

9. The apparatus of claim 1 wherein said first and second arms are pivotably connected by a hinge attached thereto proximate respective first ends thereof.

10. The apparatus of claim 9 wherein said hinge includes a torsion spring.

11. Apparatus for removing material from a belt comprising:
    a hinged V-plow comprising:
        first and second frame arms having a hinge pivotably connecting said first and second frame arms together at respective first ends thereof, whereby said first and second frame arms may be pivoted at the pivotable connection for adjusting the angle therebetween;
        a cleaning media mounted to said first and second frame arms and for providing a cleaning edge along said first and second frame arms; and
    a plow support for mounting said hinged V-plow proximate a conveyor belt, said plow support comprising:
        a base plate attached to said first and second frame arms proximate the pivotable connection thereof;
        a power arm attached at a first end to said base plate and having a second end;
        a support tube mountable transversely to a conveyor, wherein the second end of said power arm is attached to said support tube,
        wherein said support tube is rotatable, or wherein the second end of said power arm is rotatable relative to said support tube, or wherein said support tube is rotatable and the second end of said power arm is rotatable relative to said support tube; and
        tethers for supporting said first and second frame arms, wherein said power arm and said tethers prevent said first and second frame arms from contacting a conveyor belt.

12. The apparatus of claim 1 further comprising first and second media holders attached respectively to said first and second arms, wherein said cleaning media is mounted between said first arm and said first media holder and is mounted between said second arm and said second media holder for providing a cleaning edge along said first and second arms.

13. The apparatus of claim 12 wherein said first and second media holders are attached respectively to said first and second arms by fasteners.

14. The apparatus of claim 13 wherein said fasteners include pins, clevis pins, hair clip pins, cotter pins, bolts, bolts and nuts, bolts and threaded holes, rivets, welds, links, or any combination of any of the foregoing.

15. The apparatus of claim 12:
    wherein said first and second arms each comprise a first and second elongated members joined along respective long edges thereof, each first elongated member having a plurality of holes spaced apart along its length; and wherein said first and second media holders each comprise an elongated member having a plurality of holes spaced apart along its length in locations corresponding to the holes of said first and second arms;

said apparatus further comprising:

a plurality of fasteners each disposed in corresponding ones of the holes of said first and second arms and of said first and second media holders, respectively, for mounting said cleaning media therebetween.

16. The apparatus of claim 15 wherein said fasteners include pins, clevis pins, hair clip pins, cotter pins, bolts, bolts and nuts, bolts and threaded holes, rivets, welds, links, or any combination of any of the foregoing.

17. The apparatus of claim 15 wherein the second elongated member of each of said first and second arms has a plurality of holes spaced apart along its length in locations corresponding to the holes of first elongated member thereof, further comprising a media compression tool insertable through the holes of the second elongated member for applying force to the fasteners mounting said media holders and said cleaning media to the first elongated members of said first and second arms.

18. The apparatus of claim 8 wherein said mounting comprises:

a base plate attached proximate the first ends of said first and second arms; and an arm attached at a first end to said base plate and having a second end for attaching to a conveyor.

19. The apparatus of claim 18 wherein said mounting further comprises:

a support tube mountable transversely to a conveyor, wherein the second end of said arm is attached to said support tube, wherein said support tube is rotatable, or wherein the second end of said arm is rotatable relative to said support tube, or wherein said support tube is rotatable and the second end of said arm is rotatable relative to said support tube.

20. The apparatus of claim 18 further comprising a conveyor belt having a center and edges, and having a direction of travel:

wherein said arm is positioned transversely substantially near the center of the conveyor belt, wherein the pivotable connection between said first and second arms faces the direction of travel of the conveyor belt with said cleaning media engaging the conveyor belt, and wherein respective second ends of said first and second arms are proximate the edges of the conveyor belt.

21. The apparatus of claim 20 further comprising tethers for supporting the second ends of said first and second arms.

22. Apparatus for deflecting material from a belt comprising:

first and second frame arms pivotably connected together at their respective first ends, whereby said first and second frame arms may be pivoted at the pivotable connection for adjusting the angle therebetween;

a cleaning media mounted to said first frame arm and to said second frame arm for providing a cleaning edge along said first and second frame arms;

a mounting attached to said first and second frame arms proximate the pivotable connection thereof for mounting said first and second frame arms proximate a conveyor belt, said mounting comprising:

a base plate attached proximate the first ends of said first and second frame arms; and an arm attached at a first end to said base plate and having a second end for attaching to a conveyor system;

a conveyor belt having a center and edges, and having a direction of travel;

wherein said arm is positioned transversely substantially near the center of the conveyor belt, wherein the pivotable connection between said first and second frame arms faces the direction of travel of the conveyor belt with said cleaning media proximate the conveyor belt, and wherein respective second ends of said first and second frame arms are proximate the edges of the conveyor belt; and tethers for supporting the second ends of said first and second frame arms, wherein said arm and said tethers prevent said first and second frame arms and said first and second media holders from contacting the conveyor belt.

23. The apparatus of claim 8 wherein said mounting comprises an arm for supporting the first ends of said first and second arms and tethers for supporting second ends of said first and second arms.

24. Apparatus for deflecting material from a belt comprising:

first and second frame arms pivotably connected together at their respective first ends, whereby said first and second frame arms may be pivoted at the pivotable connection for adjusting the angle therebetween;

a cleaning media mounted to said first frame arm and to said second frame arm for providing a cleaning edge along said first and second frame arms; and a mounting attached to said first and second frame arms proximate the pivotable connection thereof for mounting said first and second frame arms proximate a belt, wherein said mounting comprises an arm for supporting the first ends of said first and second frame arms and tethers for supporting second ends of said first and second frame arms, wherein said arm and said tethers prevent said first and second frame arms from contacting the belt.

25. The apparatus of claim 1 further comprising a nose cap attached proximate the first ends of said first and second arms for providing a cleaning edge at an apex of said apparatus.

26. The apparatus of claim 25 wherein said cleaning media comprises first and second cleaning media, wherein said first cleaning media is mounted between said first media holder and said first arm, wherein said second cleaning media is mounted between said second media holder and said second arm, and wherein said nose cap fills any gap between said first and second cleaning media.

27. The apparatus of claim 1 wherein said cleaning media comprises first and second cleaning media, wherein said first cleaning media is mounted to said first arm, wherein said second cleaning media is mounted to said second arm, and wherein a nose cap fills any gap between said first and second cleaning media.

28. Apparatus for removing material from a belt comprising:

a hinged V-plow comprising:

first and second frame arms each comprising first and second elongated members joined along respective long edges thereof, each first elongated member having a plurality of holes spaced apart along its length;

a hinge pivotably connecting said first and second frame arms together at respective first ends thereof, wherein said hinge is attached to the respective first elongated member of each of said first and second frame arms, whereby said first and second frame arms may be pivoted at the pivotable connection for adjusting the angle therebetween;

an angle holder detachably mounted to respective second ends of said first and second frame arms for maintaining an angle therebetween;

first and second media holders each comprising an elongated member having a plurality of holes spaced apart along its length in locations corresponding to the holes of said first and second frame arms;

a cleaning media mounted between said first frame arm and said first media holder and mounted between said second frame arm and said second media holder for providing a cleaning edge along the respective first elongated members of said first and second frame arms, said cleaning media having a plurality of holes spaced apart along its length in locations corresponding to the holes of said first and second frame arms;

a plurality of fasteners each disposed in corresponding ones of the holes of said first and second frame arms, of said cleaning media and of said first and second media holders, respectively, for mounting said cleaning media to the respective first elongated members of said first and second frame arms; and a plow support comprising:
a mounting attached to said first and second frame arms proximate the pivotable connection thereof.

29. The apparatus of claim 28 wherein said mounting comprises:

a base plate attached proximate the respective first ends of said first and second frame arms; and a power arm attached at a first end to said base plate and having a second end;

a support tube mountable transversely to a conveyor, wherein the second end of said power arm is attached to said support tube, wherein said support tube is rotatable, or wherein the second end of said power arm is rotatable relative to said support tube, or wherein said support tube is rotatable and the second end of said power arm is rotatable relative to said support tube.

30. The apparatus of claim 11 further comprising an angle holder detachably attached to respective second ends of said first and second frame arms for maintaining an angle therebetween, whereby said angle holder may be detached for changing the angle.

\* \* \* \* \*